(12) United States Patent
Navratil et al.

(10) Patent No.: US 11,404,220 B2
(45) Date of Patent: Aug. 2, 2022

(54) SOLID ELECTROLYTIC CAPACITOR CONTAINING A BARRIER COATING

(71) Applicant: AVX Corporation, Fountain Inn, SC (US)

(72) Inventors: Jiri Navratil, Veseli nad Moravou (CZ); Jan Petrzilek, Usti nad Orlici (CZ); Miloslav Uher, Lanskroun (CZ)

(73) Assignee: KYOCERA AVX Components Corporation, Fountain Inn, SC (US)

( * ) Notice: Subject to any disclaimer, the term of this patent is extended or adjusted under 35 U.S.C. 154(b) by 0 days.

(21) Appl. No.: 17/024,965

(22) Filed: Sep. 18, 2020

(65) Prior Publication Data

US 2021/0082629 A1 Mar. 18, 2021

Related U.S. Application Data

(60) Provisional application No. 62/901,922, filed on Sep. 18, 2019.

(51) Int. Cl.
*H01G 9/052* (2006.01)
*H01G 9/15* (2006.01)
*H01G 9/00* (2006.01)

(52) U.S. Cl.
CPC .......... *H01G 9/052* (2013.01); *H01G 9/0036* (2013.01); *H01G 9/15* (2013.01)

(58) Field of Classification Search
CPC ......... H01G 9/052; H01G 9/0036; H01G 9/15
See application file for complete search history.

(56) References Cited

U.S. PATENT DOCUMENTS

| | | |
|---|---|---|
| 3,628,103 A | 12/1971 | Booe |
| 3,889,357 A | 6/1975 | Millard et al. |
| 4,090,288 A | 5/1978 | Thompson et al. |
| 4,206,194 A | 6/1980 | Fenton et al. |
| 4,344,107 A | 8/1982 | Webber et al. |
| 4,571,664 A | 2/1986 | Hyland |

(Continued)

FOREIGN PATENT DOCUMENTS

| | | |
|---|---|---|
| EP | 0 384 694 A2 | 8/1990 |
| EP | 1 863 044 A1 | 12/2007 |

(Continued)

OTHER PUBLICATIONS

Technical Data Sheet—Loctite Ablestik SSP 2020, Henkel, Dec. 2012, 2 pages.

(Continued)

*Primary Examiner* — Dion R. Ferguson
(74) *Attorney, Agent, or Firm* — Dority & Manning, P.A.

(57) ABSTRACT

A solid electrolytic capacitor comprising a capacitor element, anode lead extending from a surface of the capacitor element, an anode termination that is in electrical connection with the anode lead, a cathode termination that is in electrical connection with the solid electrolyte, and a casing material that encapsulates the capacitor element and anode lead is provided. A barrier coating is disposed on at least a portion of the anode termination and/or cathode termination and is in contact with the casing material. The coating contains a hydrophobic resinous material that includes an olefin polymer having a glass transition temperature of from about 20° C. to about 160° C.

30 Claims, 1 Drawing Sheet

(56) References Cited

U.S. PATENT DOCUMENTS

| | | |
|---|---|---|
| 4,780,796 A | 10/1988 | Fukuda et al. |
| 4,945,452 A | 7/1990 | Sturmer et al. |
| 5,111,327 A | 5/1992 | Blohm et al. |
| 5,457,862 A | 10/1995 | Sakata et al. |
| 5,473,503 A | 12/1995 | Sakata et al. |
| 5,729,428 A | 3/1998 | Sakata et al. |
| 5,812,367 A | 9/1998 | Kudoh et al. |
| 6,197,252 B1 | 3/2001 | Bishop et al. |
| 6,229,688 B1 * | 5/2001 | Kobayashi ............ H01G 9/0003 205/173 |
| 6,324,051 B1 | 11/2001 | Igaki et al. |
| 6,552,896 B1 | 4/2003 | Igaki et al. |
| 6,635,729 B1 | 10/2003 | Groenendaal et al. |
| 6,671,167 B2 | 12/2003 | Araki et al. |
| 6,674,635 B1 | 1/2004 | Fife et al. |
| 6,693,255 B2 | 2/2004 | Freiwald et al. |
| 6,798,645 B2 | 9/2004 | Melody et al. |
| 6,798,665 B2 | 9/2004 | Kimura |
| 6,845,004 B2 | 1/2005 | Melody et al. |
| 6,965,508 B2 | 11/2005 | Takatani et al. |
| 6,987,663 B2 | 1/2006 | Merker et al. |
| 7,125,429 B2 | 10/2006 | Melody et al. |
| 7,126,811 B2 | 10/2006 | Hirano et al. |
| 7,152,429 B2 | 12/2006 | Paradowski |
| 7,154,742 B1 | 12/2006 | Hahn et al. |
| 7,247,178 B2 | 7/2007 | Hirano et al. |
| 7,262,511 B2 | 8/2007 | Osako et al. |
| 7,350,281 B2 | 4/2008 | Schnetker |
| 7,515,396 B2 | 4/2009 | Biler |
| 7,593,216 B2 | 9/2009 | Takatani et al. |
| 7,929,274 B2 | 4/2011 | Reed et al. |
| 7,998,360 B2 | 8/2011 | Takeda et al. |
| 8,035,953 B2 | 10/2011 | Nemoto et al. |
| 8,090,548 B2 | 1/2012 | Abdennadher et al. |
| 8,125,768 B2 | 2/2012 | Horacek et al. |
| 8,203,827 B2 | 6/2012 | Karnik |
| 8,262,745 B2 | 9/2012 | Reed et al. |
| 8,310,816 B2 | 11/2012 | Chacko |
| 8,313,538 B2 | 11/2012 | Merker et al. |
| 8,379,372 B2 | 2/2013 | Zednicek et al. |
| 8,411,416 B2 * | 4/2013 | Kurita ................... H01G 9/14 361/535 |
| 8,432,665 B2 | 4/2013 | Umemoto et al. |
| 8,437,117 B2 | 5/2013 | Umemoto et al. |
| 8,824,121 B2 | 9/2014 | Biler |
| 8,842,419 B2 | 9/2014 | Djebara et al. |
| 8,896,985 B2 | 11/2014 | Chacko et al. |
| 8,896,986 B2 | 11/2014 | Chacko et al. |
| 8,902,565 B2 | 12/2014 | McConnell et al. |
| 9,190,217 B2 | 11/2015 | Snyder et al. |
| 9,236,192 B2 | 1/2016 | Biler et al. |
| 9,236,193 B2 | 1/2016 | Tatsuno et al. |
| 9,269,499 B2 | 2/2016 | Djebara et al. |
| 9,275,798 B2 | 3/2016 | Momo et al. |
| 9,293,263 B2 | 3/2016 | Liu et al. |
| 9,514,891 B2 | 12/2016 | Djebara et al. |
| 9,748,043 B2 | 8/2017 | Chacko et al. |
| 9,776,281 B2 | 10/2017 | Djebara et al. |
| 9,779,874 B2 | 10/2017 | McConnell et al. |
| 9,793,057 B2 | 10/2017 | McConnell et al. |
| 9,870,868 B1 | 1/2018 | Laforge et al. |
| 9,870,869 B1 | 1/2018 | Liu et al. |
| 9,881,774 B2 | 1/2018 | Frantz et al. |
| 9,959,979 B2 | 5/2018 | Hahn et al. |
| 10,224,150 B2 | 3/2019 | Ning et al. |
| 10,290,429 B2 | 5/2019 | Guerrero et al. |
| 10,321,571 B2 | 6/2019 | Choi et al. |
| 10,381,165 B2 | 8/2019 | Petrzilek et al. |
| 10,475,591 B2 | 11/2019 | Vilc et al. |
| 10,502,273 B2 | 12/2019 | Beyer et al. |
| 10,504,657 B2 | 12/2019 | Vilc et al. |
| 10,622,160 B2 | 4/2020 | Weaver et al. |
| 10,643,797 B2 | 5/2020 | Vilc et al. |
| 10,658,120 B2 | 5/2020 | Saito et al. |
| 10,741,333 B2 | 8/2020 | Nakata et al. |
| 10,763,046 B2 | 9/2020 | Petrzilek et al. |
| 10,770,238 B2 | 9/2020 | Djebra et al. |
| 2002/0021547 A1 | 2/2002 | Sakai et al. |
| 2007/0171596 A1 | 7/2007 | Chacko et al. |
| 2007/0285876 A1 * | 12/2007 | Takatani ................ H01G 11/56 361/524 |
| 2008/0123251 A1 | 5/2008 | Randall et al. |
| 2009/0195968 A1 | 8/2009 | Naito |
| 2010/0246100 A1 * | 9/2010 | Umemoto ................ H01G 9/15 361/535 |
| 2011/0019341 A1 * | 1/2011 | Umemoto ................ H01G 9/15 361/533 |
| 2011/0085285 A1 | 4/2011 | Zednicek et al. |
| 2011/0127694 A1 * | 6/2011 | Kurita .................... B29C 43/18 264/272.13 |
| 2014/0022704 A1 | 1/2014 | Petrzilek et al. |
| 2015/0092319 A1 * | 4/2015 | Tatsuno ................ H01G 9/028 361/525 |
| 2015/0155101 A1 | 6/2015 | Araki et al. |
| 2015/0213961 A1 * | 7/2015 | Liu ........................ H01G 9/10 361/529 |
| 2016/0104580 A1 | 4/2016 | Maeshima et al. |
| 2016/0111221 A1 | 4/2016 | Murayama et al. |
| 2016/0372268 A1 | 12/2016 | Naito et al. |
| 2017/0040116 A1 | 2/2017 | Djebara et al. |
| 2017/0207032 A1 | 7/2017 | Uher et al. |
| 2019/0148081 A1 | 5/2019 | Guerrero et al. |
| 2019/0392995 A1 * | 12/2019 | Navratil ................ H01G 9/028 |
| 2019/0392996 A1 * | 12/2019 | Navratil ................ H01G 9/15 |
| 2019/0392998 A1 * | 12/2019 | Petrzilek ............... H01G 9/028 |
| 2020/0365332 A1 * | 11/2020 | Tezuka ................. H01G 9/042 |

FOREIGN PATENT DOCUMENTS

| | | |
|---|---|---|
| EP | 1 100 097 B1 | 8/2008 |
| EP | 2 695 904 A2 | 2/2014 |
| JP | 2007227465 A | 9/2007 |
| JP | 2009266931 A | 11/2009 |
| WO | WO 2011/087870 A2 | 7/2011 |

OTHER PUBLICATIONS

Technical Data Sheet for Hysol® MG33F-0588, Electronic Grade Epoxy Molding Compound, Loctite, Henkel, May 2000, 2 pages.

Technical Data Sheet for GR2310™, Hysol®, Henkel, Jun. 2009, 2 pages.

Technical Data Sheet for Loctite Hysol GR 2811, Henkel, Jul. 2012, 2 pages.

Material Safety Data Sheet according to (EC) No. 1907/2006 for Loctite Hysol CG6077 GR2811, Henkel, Jun. 28, 2013, 8 pages.

Paper—Silver Sintering for Power Electronics, Henkel, Oct. 23, 2014, 21 pages.

Related Application Form.

International Search Report and Written Opinion for PCT/US2020/051459 dated Jan. 4, 2021, 13 pages.

\* cited by examiner

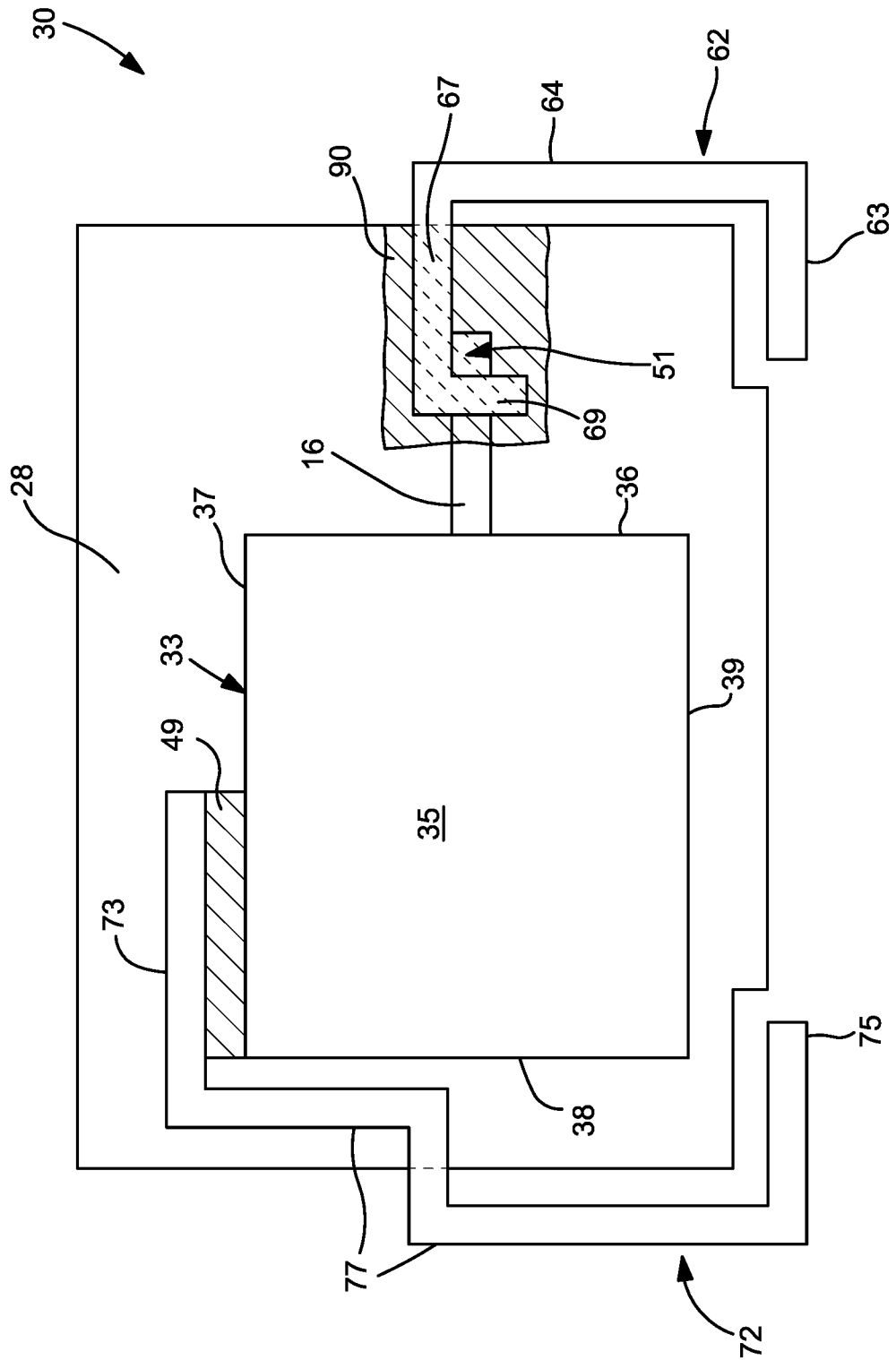

SOLID ELECTROLYTIC CAPACITOR CONTAINING A BARRIER COATING

CROSS REFERENCE TO RELATED APPLICATION

The present application claims filing benefit of U.S. Provisional Patent Application Ser. No. 62/901,922 having a filing date of Sep. 18, 2019, which is incorporated herein by reference in its entirety.

BACKGROUND OF THE INVENTION

Electrolytic capacitors (e.g., tantalum capacitors) are increasingly being used in the design of circuits due to their volumetric efficiency, reliability, and process compatibility. For example, one type of capacitor that has been developed is a solid electrolytic capacitor that includes a tantalum anode, dielectric layer, and conductive polymer solid electrolyte. To help protect the capacitor from the exterior environment and provide it with good mechanical stability, the capacitor element is also encapsulated with a casing material (e.g., epoxy resin) so that a portion of the anode and cathode terminations remain exposed for mounting to a surface. Unfortunately, it has been discovered that high temperatures that are often used during manufacture of the capacitor (e.g., reflow) can cause residual moisture to vaporize as steam, which may exit the case with considerable force and cause micro-cracks to form in the casing material. These micro-cracks can lead to delamination of the casing material from the capacitor element and also a rapid deterioration of the electrical properties. Further, oxygen may also diffuse into the cathode, further enhancing the degradation of electrical properties at high temperatures, particularly when the capacitor is exposed to high temperatures. As such, a need exists for an improved solid electrolytic capacitor that is capable of exhibiting better electrical performance, particularly at high temperatures.

SUMMARY OF THE INVENTION

In accordance with one embodiment of the present invention, a solid electrolytic capacitor is disclosed that comprises a capacitor element that contains a sintered porous anode body, a dielectric that overlies the anode body, and a solid electrolyte that overlies the dielectric; an anode lead extending from a surface of the capacitor element; an anode termination that is in electrical connection with the anode lead; a cathode termination that is in electrical connection with the solid electrolyte; and a casing material that encapsulates the capacitor element and anode lead. A barrier coating is disposed on at least a portion of the anode termination and/or cathode termination and is in contact with the casing material. The coating comprises a hydrophobic resinous material that contain an olefin polymer having a glass transition temperature of from about 20° C. to about 160° C.

Other features and aspects of the present invention are set forth in greater detail below.

BRIEF DESCRIPTION OF THE DRAWING

A full and enabling disclosure of the present invention, including the best mode thereof, directed to one of ordinary skill in the art, is set forth more particularly in the remainder of the specification, which makes reference to the appended drawing in which:

FIG. 1 is a schematic illustration of one embodiment of a solid electrolytic capacitor that may be formed in accordance with the present invention.

Repeat use of references characters in the present specification and drawing is intended to represent same or analogous features or elements of the invention.

DETAILED DESCRIPTION OF REPRESENTATIVE EMBODIMENTS

It is to be understood by one of ordinary skill in the art that the present discussion is a description of exemplary embodiments only, and is not intended as limiting the broader aspects of the present invention, which broader aspects are embodied in the exemplary construction.

Generally speaking, the present invention is directed to a solid electrolytic capacitor that contains a capacitor element including a porous anode body, dielectric overlying the anode body, and solid electrolyte overlying the dielectric. An anode lead extends from the anode body and is in electrical contact with an anode termination. A cathode termination is likewise in electrical contact with the solid electrolyte. Further, a casing material encapsulates the capacitor element and anode lead and leaves exposed at least a portion of the anode termination and cathode termination for external contact. To help minimize the likelihood of delamination and oxygen diffusion, a barrier coating is also employed in the capacitor that covers at least a portion of the anode termination and/or cathode termination and is in contact with the casing material. The barrier coating contains a hydrophobic resinous material that includes an olefin polymer having a glass transition temperature of from about 20° C. to about 160° C., in some embodiments from about 40° C. to about 150° C., and in some embodiments, from about 60° C. to about 120° C., as determined in accordance with JIS K 7121:2012 (e.g., at a rate of temperature increase of 10° C./min). Without intending to be limited by theory, it is believed that such materials may not only act as a barrier to moisture and oxygen, but they can also help impart the resulting coating with an enhanced degree of adhesion to to the casing material, which makes it less likely to delaminate from the capacitor element when exposed to the high temperatures often experienced during manufacturing of the capacitor (e.g., reflow).

Any of a variety of olefin polymers having the desired glass temperature may be employed in the resinous material. In one particular embodiment, for instance, the olefin polymer may be a cycloolefin polymer. Cycloolefin resins are polymer compounds having a main chain composed of carbon-carbon bonds in which at least a part of the main chain has a cyclic hydrocarbon structure. This cyclic hydrocarbon structure is introduced by using a monomer having at least one olefinic double bond in the cyclic hydrocarbon structure ("cycloolefin"), such as as norbornene or tetracyclododecene. Specific examples of suitable cycloolefin monomers for use in forming the polymer may include, for instance, monocyclic cycloolefins, such as cyclopentene, cyclohexene, cyclooctene, cyclopentadiene and 1,3-cyclohexadiene; bicyclic cycloolefins, such as bicyclo[2.2.1]hept-2-ene ("norbornene"), 5-methyl-bicyclo[2.2.1]hept-2-ene, 5,5-dimethyl-bicyclo[2.2.1]hept-2-ene, 5-ethyl-bicyclo[2.2.1]hept-2-ene, 5-butyl-bicyclo[2.2.1]hept-2-ene, 5-ethylidene-bicyclo[2.2.1]hept-2-ene, 5-hexyl-bicyclo[2.2.1]hept-2-ene, 5-octyl-bicyclo[2.2.1]hept-2-ene, 5-octadecyl-bicyclo[2.2.1]hept-2-ene, 5-methylidene-bicyclo[2.2.1]hept-2-ene, 5-vinyl-bicyclo[2.2.1]hept-2-ene and 5-propenyl-bicyclo[2.2.1]hept-2-ene; tricyclic cycloolefins, such as tricyclo[4.3.0.1$^{2,5}$]deca-3,7-diene ("dicyclopentadiene"), tricyclo[4.3.0.1$^{2,5}$]dec-3-ene; tricyclo[4.4.0.1$^{2,5}$]undeca-3,7-diene or tricyclo[4.4.0.1$^{2,5}$]undeca-3,8-diene, or tricyclo[4.4.0.1$^{2,5}$]undec-3-ene that is a partially hydrogenated product (or an adduct of cyclopentadiene and cyclohexene) thereof, 5-,cycopentyl-bicyclo[2.2.1]hept-2-ene, 5-cyclohexyl-bicyclo[2.2.1]hept-2-ene, 5-cyclohexenyl bicyclo[2.2.1]hept-2-ene, and 5-phenyl-bicyclo[2.2.1]hept-2-ene; tetracyclic cycloolefins, such as tetracyclo [4.4.0.1$^{2,5}$1$^{7,10}$]dodec-3-ene ("tetracyclododecene"), 8-methyltetracyclo[4.4.0.1$^{2,5}$1$^{7,10}$]dodec-3-ene, 8-ethyltetracyclo[4.4.0.1$^{2,5}$1$^{7,10}$]dodec-3-ene, 8-methylidenetetracyclo[4.4.0.1$^{2,5}$1$^{7,10}$]dodec-3-ene, 8-ethylidenetetracyclo [4.4.0.1$^{2,5}$1$^{7,10}$]dodec-3-ene, 8-vinyltetracyclo[4.4.0.1$^{2,5}$ 1$^{7,10}$]dodec-3-ene and 8-propenyl-tetracyclo[4.4.0.1$^{2,5}$1$^{7,10}$] dodec-3-ene; polycyclic cycloolefins, such as 8-cyclopentyl-tetracyclo[4.4.0.1$^{2,5}$1$^{7,10}$]dodec-3-ene, 8-cyclohexyl-tetracyclo[4.4.0.1$^{2,5}$1$^{7,10}$]dodec-3-ene, 8-cyclohexenyl-tetracyclo[4.4.0.1$^{2,5}$1$^{7,10}$]dodec-3-ene, 8-phenyl-cyclopentyl-tetracyclo[4.4.0.1$^{2,5}$1$^{7,10}$]dodec-3-ene, tetracyclo[7.4.1$^{3,6}$.0$^{1,9}$.0.$^{2,7}$]tetradeca-4,9,11,13-tetraene ("1,4-methano-1,4,4a,9a-tetrahydrofluorene"), tetracyclo [8.4.1$^{4,7}$.0.$^{1,10}$.0.$^{3,8}$]pentadeca-5,10,12,14-tetraene ("1,4-methano-1,4,4a,5,10,10a-hexahydroanthracene"), pentacyclo[6.6.1.1$^{3,6}$.0.$^{2,7}$.0.$^{9,14}$]-4-hexadecene, pentacyclo [6.5.1.1$^{3,6}$.0.$^{2,7}$.0.$^{9,13}$]-4-pentadecene, pentacyclo [7.4.0.0.$^{2,7}$.1.$^{3,6}$.1.$^{10,13}$]-4-pentadecene, heptacyclo [8.7.0.1.$^{2,9}$.1.$^{4,7}$.1.$^{11,17}$.0.$^{3,8}$.0.$^{12,16}$]-5-eicosene, heptacyclo [8.7.0.1.$^{2,9}$.0.$^{3,8}$.1.$^{4,7}$.0.$^{12,17}$.1.$^{13,16}$]-14-eicosene; and tetramers of cyclopentadiene, and so forth.

The cycloolefin monomer(s) may be unsubstituted or substituted with a functional group. One example of such a functional group is a hydrocarbon group, such as an alkyl group (e.g., methyl, ethyl, n-propyl, isopropyl, n-butyl group, 2-methylpropyl, n-heptyl group, n-hexyl), which is modified with a least one halogen atom (e.g., chlorine or fluorine). Suitable halogenated hydrocarbon groups may include, for instance, trifluoromethyl or trichloromethyl. The cycloolefin monomers may also be used alone to form a homopolymer or in combination (e.g., two or more) to form a copolymer. For instance, the cycloolefin polymer may be a copolymer of a cycloolefin monomer and one or more additional co-monomers, such as an α-olefin co-monomer, halogenated hydrocarbon co-monomer, etc. Specific examples of suitable α-olefin co-monomers that are copolymerizable with the cycloolefin monomers may include, for instance, an α-olefin having 2 to 20 carbon atoms, and in some embodiments, from 2 to 8 carbon atoms, such as ethylene, propylene, 1-butene, 1-pentene, 1-hexene, 3-methyl-1-butene, 3-methyl-1-pentene, 3-ethyl-1-pentene, 4-methyl-1-pentene, 4-methyl-1-hexene, 4,4-dimethyl-1-hexene, 4,4-dimethyl-1-pentene, 4-ethyl-1-hexene, 3-ethyl-1-hexene, 1-octene, 1-decene, 1-dodecene, 1-tetradecene, 1-hexadecene, 1-octadecene, 1-eicosene, etc. These α-olefins may be used alone or in combination of two or more types thereof. Ethylene may be particularly suitable for use as a co-monomer in combination with a cycloolefin monomer, such as norbornene or tetracyclododecene.

The cycloolefin polymer may be produced using any known technique as is known in the art. For example, the polymer may be obtained by ring-opening polymerization of a cycloolefin monomer using a metathesis polymerization catalyst that contains a transition metal halide and an organometallic compound. The combined solution can be obtained by hydrogenation by contacting with hydrogen in the presence of a hydrogenation catalyst. Alternatively, the polymer may be formed using a well-known catalyst, such as a Ziegler-Natta catalyst.

To help aid in its application, the barrier coating may be initially provided in the form of a coating formulation that contains the hydrophobic resinous material (e.g., cycloolefin polymer) in combination with an organic solvent, which is typically a liquid at room temperature. When employed, such solvents typically constitute from about 70 wt. % to about 99.9 wt. %, in some embodiments from about 80 wt. % to about 99.8 wt. %, and in some embodiments, from about 90 wt. % to about 99.5 wt. % of the formulation, while the hydrophobic resinous material may constitute from about 0.1 wt. % to about 30 wt. %, in some embodiments from about 0.2 wt. % to about 20 wt. %, and in some embodiments, from about 0.5 wt. % to about 10 wt. % of the solution. The solvent(s) employed will depend in part on the nature of the resinous material, but generally include organic alcohols, hydrocarbon solvents, fluorinated hydrocarbon solvents, etc. For example, particularly suitable solvents for use with cycloolefin polymers may hydrocarbon solvents, such as aromatic hydrocarbons (e.g., xylene, toluene and ethylbenzene); cyclic hydrocarbons, such as alicyclic hydrocarbons (e.g., cyclohexane, cyclohexene and methylcyclohexane); aliphatic hydrocarbons (e.g., hexane, heptane, octane and decane); etc., as well as combination thereof. Alicyclic hydrocarbons are particularly suitable for use in the coating formulation.

The coating formulation may be applied using a variety of known techniques, such as by spin coating, impregnation, pouring, dropwise application, injection, spraying, doctor blading, brushing, printing (e.g., ink-jet, screen, or pad printing), or dipping. Regardless, once applied, the coating formulation may be dried, heated, and/or cured to remove any remaining solvent(s) and leave a coating of the resinous material at the desired location.

Through selective control over the particular nature of the barrier coating, the resulting capacitor is may be resistant to delamination during manufacturing and can thus exhibit excellent electrical properties. For example, the capacitor may exhibit a dry capacitance of about 20 microFarads (μF) or more, in some embodiments about 25 μF or more, in some embodiments from about 30 to about 100 μF, and in some embodiments, from about 40 to about 80 μF, measured at a frequency of 120 Hz at temperature of about 23° C. Notably, the capacitance values can still remain stable even at high temperatures. For example, the capacitor may exhibit an aged capacitance value at a temperature of about 23° C. within the ranges noted above even after being exposed to "high temperature storage" testing at a temperature of from about 80° C. or more, in some embodiments from about 100° C. to about 180° C., and in some embodiments, from about 105° C. to about 150° C. (e.g., about 105° C., 125° C., or 150° C.) for a substantial period of time, such as for about 100 hours or more, and in some embodiments, from about 150 hours to about 3,000 hours (e.g., 500, 1,000, 1,500, 2,000, 2,500, or 3,000 hours), and then being allowed to recover for about 1 to 2 hours. In one embodiment, for example, the capacitor may exhibit an aged capacitance value (at 23° C.) within the ranges noted above after being exposed to high temperature storage testing at a temperature of 150° C. for 3,000 hours (recovery time of from 1 to 2 hours). In this regard, the ratio of the aged capacitance at 23° C. after being subjected to "high temperature storage testing" to the initial capacitance at 23° C. prior to "high temperature storage testing" may be from about 0.6 to 1, in some embodiments about from about 0.7 to 1, in some embodiments from about 0.8 to 1, and in some embodiments, from about 0.9 to 1.

The capacitor may exhibit other good electrical properties. For instance, the capacitor may exhibit a relatively low equivalence series resistance ("ESR"), such as about 200 mohms or less, in some embodiments about 150 mohms or less, in some embodiments from about 0.01 to about 100 mohms, and in some embodiments, from about 0.1 to about 60 mohms, measured at an operating frequency of 100 kHz and temperature of about 23° C. Similar to the capacitance values, the aged ESR after "high temperature storage" testing as described above may also remain stable and within the ranges noted above. In one embodiment, for example, the ratio of the aged ESR at 23° C. after being subjected to "high temperature storage testing" to the initial ESR at 23° C. prior to "high temperature storage testing" may be about 10 or less, in some embodiments about 8 or less, in some embodiments about 5 or less, in some embodiments about from about 0.7 to 4, in some embodiments from about 0.8 to 3, and in some embodiments, from 1 to about 2.

The capacitor may also exhibit a DCL of only about 50 microamps ("pA") or less, in some embodiments about 40 pA or less, in some embodiments about 30 pA or less, in some embodiments about 20 pA or less, in some embodiments about 10 pA or less, in some embodiments from about 9 pA or less, and in some embodiments, from about 0.01 to about 8 pA at a temperature of about 23° C. after being subjected to an applied voltage (e.g., rated voltage or a multiple of the rated voltage, such as 1.1× rated voltage) for a period of time of about 60 seconds. Notably, the low DCL values can still remain stable even at temperatures. For example, the capacitor may exhibit a low DCL within the ranges noted above after being exposed to high temperatures, such as of from about 80° C. to about 150° C. (e.g., about 85° C.) for a substantial period of time, such as for about 100 hours or more, and in some embodiments, from about 120 hours to about 1,500 hours (e.g., 120, 250, 500, 1,000, or 1,500 hours), and then being allowed to recover for about 1 to 2 hours. In one embodiment, for example, the capacitor may exhibit an aged DCL value (at 23° C.) within the ranges noted above after being exposed to testing at a temperature of 85° C. for 1,500 hours (recovery time of from 1 to 2 hours). In this regard, the ratio of the aged DCL at 23° C. after being subjected to "high temperature testing" to the initial DCL at 23° C. prior to "high temperature testing" may be about 10 or less, in some embodiments about 5 or less, in some embodiments about 2 or less, in some embodiments about 1 or less, in some embodiments from about 0.05 to about 0.8, and in some embodiments, from about 0.1 to about 0.5.

The DCL may also remain stable after being exposed to "high humidity testing" at a high relative humidity level (without or without the high temperatures indicated above), such as about 40% or more, in some embodiments about 45% or more, in some embodiments about 50% or more, and in some embodiments, about 70% or more (e.g., about 85% to 100%) for a substantial period of time as noted above. Relative humidity may, for instance, be determined in accordance with ASTM E337-02, Method A (2007). For example, the capacitor may exhibit an aged DCL value (at 23° C.) within the ranges noted above after being exposed to a humidity level of 85% and temperature of 85° C. for a substantial period of time, such as for about 100 hours or more, and in some embodiments, from about 120 hours to about 1,500 hours (e.g., 120, 250, 500, 1,000, or 1,500 hours), and then being allowed to recover for about 1 to 2 hours. For example, the ratio of the aged DCL (23° C.) of the capacitor after being exposed to a high humidity level (e.g., about 85%) and high temperature (e.g., about 85° C.) for 1,500 hours (recovery time of 1 to 2 hrs) to the initial DCL prior to such testing may be about 10 or less, in some embodiments about 5 or less, in some embodiments about 2 or less, in some embodiments about 1 or less, in some embodiments from about 0.05 to about 0.8, and in some embodiments, from about 0.1 to about 0.5.

Various embodiments of the capacitor will now be described in more detail.

I. Capacitor Element

A. Anode Body

The capacitor element includes an anode that contains a dielectric formed on a sintered porous body. The porous anode body may be formed from a powder that contains a valve metal (i.e., metal that is capable of oxidation) or valve metal-based compound, such as tantalum, niobium, aluminum, hafnium, titanium, alloys thereof, oxides thereof, nitrides thereof, and so forth. The powder is typically formed from a reduction process in which a tantalum salt (e.g., potassium fluorotantalate ($K_2TaF_7$), sodium fluorotantalate ($Na_2TaF_7$), tantalum pentachloride ($TaCl_5$), etc.) is reacted with a reducing agent. The reducing agent may be provided in the form of a liquid, gas (e.g., hydrogen), or solid, such as a metal (e.g., sodium), metal alloy, or metal salt. In one embodiment, for instance, a tantalum salt (e.g., $TaCl_5$) may be heated at a temperature of from about 900° C. to about 2,000° C., in some embodiments from about 1,000° C. to about 1,800° C., and in some embodiments, from about 1,100° C. to about 1,600° C., to form a vapor that can be reduced in the presence of a gaseous reducing agent (e.g., hydrogen). Additional details of such a reduction reaction may be described in WO 2014/199480 to Maeshima, et al. After the reduction, the product may be cooled, crushed, and washed to form a powder.

The specific charge of the powder typically varies from about 2,000 to about 600,000 microFarads*Volts per gram ("μF*V/g") depending on the desired application. For instance, in certain embodiments, a high charge powder may be employed that has a specific charge of from about 100,000 to about 550,000 μF*V/g, in some embodiments from about 120,000 to about 500,000 μF*V/g, and in some embodiments, from about 150,000 to about 400,000 μF*V/g. In other embodiments, a low charge powder may be employed that has a specific charge of from about 2,000 to about 100,000 μF*V/g, in some embodiments from about 5,000 to about 80,000 μF*V/g, and in some embodiments, from about 10,000 to about 70,000 μF*V/g. As is known in the art, the specific charge may be determined by multiplying capacitance by the anodizing voltage employed, and then dividing this product by the weight of the anodized electrode body.

The powder may be a free-flowing, finely divided powder that contains primary particles. The primary particles of the powder generally have a median size (D50) of from about 5 to about 500 nanometers, in some embodiments from about 10 to about 400 nanometers, and in some embodiments, from about 20 to about 250 nanometers, such as determined using a laser particle size distribution analyzer made by BECKMAN COULTER Corporation (e.g., LS-230), optionally after subjecting the particles to an ultrasonic wave vibration of 70 seconds. The primary particles typically have a three-dimensional granular shape (e.g., nodular or angular). Such particles typically have a relatively low "aspect ratio", which is the average diameter or width of the particles divided by the average thickness ("D/T"). For example, the aspect ratio of the particles may be about 4 or less, in some embodiments about 3 or less, and in some embodiments, from about 1 to about 2. In addition to primary particles, the powder may also contain other types of particles, such as secondary particles formed by aggregating (or agglomerating) the primary particles. Such secondary particles may have a median size (D50) of from about 1 to about 500 micrometers, and in some embodiments, from about 10 to about 250 micrometers.

Agglomeration of the particles may occur by heating the particles and/or through the use of a binder. For example, agglomeration may occur at a temperature of from about 0° C. to about 40° C., in some embodiments from about 5° C. to about 35° C., and in some embodiments, from about 15° C. to about 30° C. Suitable binders may likewise include, for instance, poly(vinyl butyral); poly(vinyl acetate); poly(vinyl alcohol); poly(vinyl pyrollidone); cellulosic polymers, such as carboxymethylcellulose, methyl cellulose, ethyl cellulose, hydroxyethyl cellulose, and methylhydroxyethyl cellulose; atactic polypropylene, polyethylene; polyethylene glycol (e.g., Carbowax from Dow Chemical Co.); polystyrene, poly(butadiene/styrene); polyamides, polyimides, and polyacrylamides, high molecular weight polyethers; copolymers of ethylene oxide and propylene oxide; fluoropolymers, such as polytetrafluoroethylene, polyvinylidene fluoride, and fluoro-olefin copolymers; acrylic polymers, such as sodium polyacrylate, poly(lower alkyl acrylates), poly (lower alkyl methacrylates) and copolymers of lower alkyl acrylates and methacrylates; and fatty acids and waxes, such as stearic and other soapy fatty acids, vegetable wax, microwaxes (purified paraffins), etc.

The resulting powder may be compacted to form a pellet using any conventional powder press device. For example, a press mold may be employed that is a single station compaction press containing a die and one or multiple punches. Alternatively, anvil-type compaction press molds may be used that use only a die and single lower punch. Single station compaction press molds are available in several basic types, such as cam, toggle/knuckle and eccentric/crank presses with varying capabilities, such as single action, double action, floating die, movable platen, opposed ram, screw, impact, hot pressing, coining or sizing. The powder may be compacted around an anode lead, which may be in the form of a wire, sheet, etc. The lead may extend in a longitudinal direction from the anode body and may be formed from any electrically conductive material, such as tantalum, niobium, aluminum, hafnium, titanium, etc., as well as electrically conductive oxides and/or nitrides of thereof. Connection of the lead may also be accomplished using other known techniques, such as by welding the lead to the body or embedding it within the anode body during formation (e.g., prior to compaction and/or sintering).

Any binder may be removed after pressing by heating the pellet under vacuum at a certain temperature (e.g., from about 150° C. to about 500° C.) for several minutes. Alternatively, the binder may also be removed by contacting the pellet with an aqueous solution, such as described in U.S. Pat. No. 6,197,252 to Bishop, et al. Thereafter, the pellet is sintered to form a porous, integral mass. The pellet is typically sintered at a temperature of from about 700° C. to about 1800° C., in some embodiments from about 800° C. to about 1700° C., and in some embodiments, from about 900° C. to about 1400° C., for a time of from about 5 minutes to about 100 minutes, and in some embodiments, from about 8 minutes to about 15 minutes. This may occur in one or more steps. If desired, sintering may occur in an atmosphere that limits the transfer of oxygen atoms to the anode. For example, sintering may occur in a reducing atmosphere, such as in a vacuum, inert gas, hydrogen, etc. The reducing atmosphere may be at a pressure of from about 10 Torr to about 2000 Torr, in some embodiments from about 100 Torr to about 1000 Torr, and in some embodiments, from about 100 Torr to about 930 Torr. Mixtures of hydrogen and other gases (e.g., argon or nitrogen) may also be employed.

B. Dielectric

The anode is also coated with a dielectric. The dielectric may be formed by anodically oxidizing ("anodizing") the sintered anode so that a dielectric layer is formed over and/or within the anode. For example, a tantalum (Ta) anode may be anodized to tantalum pentoxide ($Ta_2O_5$). Typically, anodization is performed by initially applying a solution to the anode, such as by dipping anode into the electrolyte. A solvent is generally employed, such as water (e.g., deionized water). To enhance ionic conductivity, a compound may be employed that is capable of dissociating in the solvent to form ions. Examples of such compounds include, for instance, acids, such as described below with respect to the electrolyte. For example, an acid (e.g., phosphoric acid) may constitute from about 0.01 wt. % to about 5 wt. %, in some embodiments from about 0.05 wt. % to about 0.8 wt. %, and in some embodiments, from about 0.1 wt. % to about 0.5 wt. % of the anodizing solution. If desired, blends of acids may also be employed.

A current is passed through the anodizing solution to form the dielectric layer. The value of the formation voltage manages the thickness of the dielectric layer. For example, the power supply may be initially set up at a galvanostatic mode until the required voltage is reached. Thereafter, the power supply may be switched to a potentiostatic mode to ensure that the desired dielectric thickness is formed over the entire surface of the anode. Of course, other known methods may also be employed, such as pulse or step potentiostatic methods. The voltage at which anodic oxidation occurs typically ranges from about 4 to about 250 V, and in some embodiments, from about 5 to about 200 V, and in some embodiments, from about 10 to about 150V. During oxidation, the anodizing solution can be kept at an elevated temperature, such as about 30° C. or more, in some embodiments from about 40° C. to about 200° C., and in some embodiments, from about 50° C. to about 100° C. Anodic oxidation can also be done at ambient temperature or lower. The resulting dielectric layer may be formed on a surface of the anode and within its pores.

Although not required, in certain embodiments, the dielectric layer may possess a differential thickness throughout the anode in that it possesses a first portion that overlies an external surface of the anode and a second portion that overlies an interior surface of the anode. In such embodiments, the first portion is selectively formed so that its thickness is greater than that of the second portion. It should be understood, however, that the thickness of the dielectric layer need not be uniform within a particular region. Certain portions of the dielectric layer adjacent to the external surface may, for example, actually be thinner than certain portions of the layer at the interior surface, and vice versa. Nevertheless, the dielectric layer may be formed such that at least a portion of the layer at the external surface has a greater thickness than at least a portion at the interior surface. Although the exact difference in these thicknesses may vary depending on the particular application, the ratio of the thickness of the first portion to the thickness of the second portion is typically from about 1.2 to about 40, in some embodiments from about 1.5 to about 25, and in some embodiments, from about 2 to about 20.

To form a dielectric layer having a differential thickness, a multi-stage process is generally employed. In each stage of the process, the sintered anode is anodically oxidized ("anodized") to form a dielectric layer (e.g., tantalum pentoxide). During the first stage of anodization, a relatively small forming voltage is typically employed to ensure that the desired dielectric thickness is achieved for the inner region, such as forming voltages ranging from about 1 to about 90 volts, in some embodiments from about 2 to about 50 volts, and in some embodiments, from about 5 to about 20 volts. Thereafter, the sintered body may then be anodically oxidized in a second stage of the process to increase the thickness of the dielectric to the desired level. This is generally accomplished by anodizing in an electrolyte at a higher voltage than employed during the first stage, such as at forming voltages ranging from about 50 to about 350 volts, in some embodiments from about 60 to about 300 volts, and in some embodiments, from about 70 to about 200 volts. During the first and/or second stages, the electrolyte may be kept at a temperature within the range of from about 15° C. to about 95° C., in some embodiments from about 20° C. to about 90° C., and in some embodiments, from about 25° C. to about 85° C.

The electrolytes employed during the first and second stages of the anodization process may be the same or different. Typically, however, it is desired to employ different solutions to help better facilitate the attainment of a higher thickness at the outer portions of the dielectric layer. For example, it may be desired that the electrolyte employed in the second stage has a lower ionic conductivity than the electrolyte employed in the first stage to prevent a significant amount of oxide film from forming on the internal surface of anode. In this regard, the electrolyte employed during the first stage may contain an acidic compound, such as nitric acid, sulfuric acid, phosphoric acid, polyphosphoric acid, boric acid, boronic acid, etc. Such an electrolyte may have an electrical conductivity of from about 0.1 to about 100 mS/cm, in some embodiments from about 0.2 to about 20 mS/cm, and in some embodiments, from about 1 to about 10 mS/cm, determined at a temperature of 25° C. The electrolyte employed during the second stage typically contains a salt of a weak acid so that the hydronium ion concentration increases in the pores as a result of charge passage therein. Ion transport or diffusion is such that the weak acid anion moves into the pores as necessary to balance the electrical charges. As a result, the concentration of the principal conducting species (hydronium ion) is reduced in the establishment of equilibrium between the hydronium ion, acid anion, and undissociated acid, thus forms a poorer-conducting species. The reduction in the concentration of the conducting species results in a relatively high voltage drop in the electrolyte, which hinders further anodization in the interior while a thicker oxide layer, is being built up on the outside to a higher formation voltage in the region of continued high conductivity. Suitable weak acid salts may include, for instance, ammonium or alkali metal salts (e.g., sodium, potassium, etc.) of boric acid, boronic acid, acetic acid, oxalic acid, lactic acid, adipic acid, etc. Particularly suitable salts include sodium tetraborate and ammonium pentaborate. Such electrolytes typically have an electrical conductivity of from about 0.1 to about 20 mS/cm, in some embodiments from about 0.5 to about 10 mS/cm, and in some embodiments, from about 1 to about 5 mS/cm, determined at a temperature of 25° C.

If desired, each stage of anodization may be repeated for one or more cycles to achieve the desired dielectric thickness. Furthermore, the anode may also be rinsed or washed with another solvent (e.g., water) after the first and/or second stages to remove the electrolyte.

C. Solid Electrolyte

A solid electrolyte overlies the dielectric and generally functions as the cathode for the capacitor. The solid electrolyte may include materials as is known in the art, such as conductive polymers (e.g., polypyrroles, polythiophenes, polyanilines, etc.), manganese dioxide, and so forth. In one embodiment, for example, the solid electrolyte contains one or more layers containing extrinsically and/or intrinsically conductive polymer particles. One benefit of employing such particles is that they can minimize the presence of ionic species (e.g., $Fe^{2+}$ or $Fe^{3+}$) produced during conventional in situ polymerization processes, which can cause dielectric breakdown under high electric field due to ionic migration. Thus, by applying the conductive polymer as pre-polymerized particles rather through in situ polymerization, the resulting capacitor may exhibit a relatively high "breakdown voltage." If desired, the solid electrolyte may be formed from one or multiple layers. When multiple layers are employed, it is possible that one or more of the layers includes a conductive polymer formed by in situ polymerization. However, when it is desired to achieve very high breakdown voltages, the solid electrolyte may desirably be formed primarily from the conductive particles described above, such that it is generally free of conductive polymers formed via in situ polymerization. Regardless of the number of layers employed, the resulting solid electrolyte typically has a total a thickness of from about 1 micrometer (μm) to about 200 μm, in some embodiments from about 2 μm to about 50 μm, and in some embodiments, from about 5 μm to about 30 μm.

Thiophene polymers are particularly suitable for use in the solid electrolyte. In certain embodiments, for instance, an "extrinsically" conductive thiophene polymer may be employed in the solid electrolyte that has repeating units of the following formula (I):

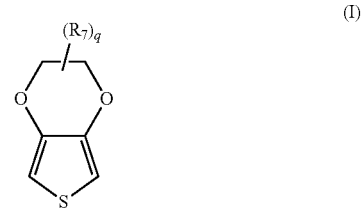

wherein, $R_7$ is a linear or branched, $C_1$ to $C_{18}$ alkyl radical (e.g., methyl, ethyl, n- or iso-propyl, n-, iso-, sec- or tert-butyl, n-pentyl, 1-methylbutyl, 2-methylbutyl, 3-methylbutyl, 1-ethylpropyl, 1,1-dimethylpropyl, 1,2-dimethylpropyl, 2,2-dimethylpropyl, n-hexyl, n-heptyl, n-octyl, 2-ethylhexyl, n-nonyl, n-decyl, n-undecyl, n-dodecyl, n-tridecyl, n-tetradecyl, n-hexadecyl, n-octadecyl, etc.); $C_5$ to $C_{12}$ cycloalkyl radical (e.g., cyclopentyl, cyclohexyl, cycloheptyl, cyclooctyl, cyclononyl, cyclodecyl, etc.); $C_6$ to $C_{14}$ aryl radical (e.g., phenyl, naphthyl, etc.); $C_7$ to $C_{18}$ aralkyl radical (e.g., benzyl, o-, m-, p-tolyl, 2,3-, 2,4-, 2,5-, 2-6, 3-4-, 3,5-xylyl, mesityl, etc.); and q is an integer from 0 to 8, in some embodiments, from 0 to 2, and in one embodiment, 0. In one particular embodiment, "q" is 0 and the polymer is poly(3,4-ethylenedioxythiophene). One commercially suitable example of a monomer suitable for forming such a polymer is 3,4-ethylenedioxthiophene, which is available from Heraeus under the designation Clevios™ M.

The polymers of formula (I) are generally considered to be "extrinsically" conductive to the extent that they typically require the presence of a separate counterion that is not covalently bound to the polymer. The counterion may be a monomeric or polymeric anion that counteracts the charge of the conductive polymer. Polymeric anions can, for example, be anions of polymeric carboxylic acids (e.g., polyacrylic acids, polymethacrylic acid, polymaleic acids, etc.); polymeric sulfonic acids (e.g., polystyrene sulfonic acids ("PSS"), polyvinyl sulfonic acids, etc.); and so forth. The acids may also be copolymers, such as copolymers of vinyl carboxylic and vinyl sulfonic acids with other polymerizable monomers, such as acrylic acid esters and styrene. Likewise, suitable monomeric anions include, for example, anions of $C_1$ to $C_{20}$ alkane sulfonic acids (e.g., dodecane sulfonic acid); aliphatic perfluorosulfonic acids (e.g., trifluoromethane sulfonic acid, perfluorobutane sulfonic acid or perfluorooctane sulfonic acid); aliphatic $C_1$ to $C_{20}$ carboxylic acids (e.g., 2-ethyl-hexylcarboxylic acid); aliphatic perfluorocarboxylic acids (e.g., trifluoroacetic acid or perfluorooctanoic acid); aromatic sulfonic acids optionally substituted by $C_1$ to $C_{20}$ alkyl groups (e.g., benzene sulfonic acid, o-toluene sulfonic acid, p-toluene sulfonic acid or dodecylbenzene sulfonic acid); cycloalkane sulfonic acids (e.g., camphor sulfonic acid or tetrafluoroborates, hexafluorophosphates, perchlorates, hexafluoroantimonates, hexafluoroarsenates or hexachloroantimonates); and so forth. Particularly suitable counteranions are polymeric anions, such as a polymeric carboxylic or sulfonic acid (e.g., polystyrene sulfonic acid ("PSS")). The molecular weight of such polymeric anions typically ranges from about 1,000 to about 2,000,000, and in some embodiments, from about 2,000 to about 500,000.

Intrinsically conductive polymers may also be employed that have a positive charge located on the main chain that is at least partially compensated by anions covalently bound to the polymer. For example, one example of a suitable intrinsically conductive thiophene polymer may have repeating units of the following formula (II):

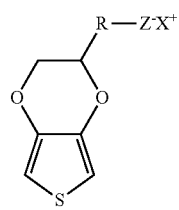

(II)

wherein,
R is $(CH_2)_a$—O—$(CH_2)_b$-L, where L is a bond or HC($[CH_2]_cH$);
a is from 0 to 10, in some embodiments from 0 to 6, and in some embodiments, from 1 to 4 (e.g., 1);
b is from 1 to 18, in some embodiments from 1 to 10, and in some embodiments, from 2 to 6 (e.g., 2, 3, 4, or 5);
c is from 0 to 10, in some embodiments from 0 to 6, and in some embodiments, from 1 to 4 (e.g., 1);
Z is an anion, such as $SO_3^-$, $C(O)O^-$, $BF_4^-$, $CF_3SO_3^-$, $SbF_6^-$, $N(SO_2CF_3)_2^-$, $C_4H_3O_4^-$, $ClO_4^-$, etc.;

X is a cation, such as hydrogen, an alkali metal (e.g., lithium, sodium, rubidium, cesium or potassium), ammonium, etc.

In one particular embodiment, Z in formula (II) is a sulfonate ion such that the intrinsically conductive polymer contains repeating units of the following formula (III):

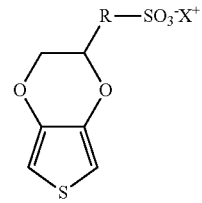

(III)

wherein, R and X are defined above. In formula (II) or (III), a is preferably 1 and b is preferably 3 or 4. Likewise, X is preferably sodium or potassium.

If desired, the polymer may be a copolymer that contains other types of repeating units. In such embodiments, the repeating units of formula (II) typically constitute about 50 mol. % or more, in some embodiments from about 75 mol. % to about 99 mol. %, and in some embodiments, from about 85 mol. % to about 95 mol. % of the total amount of repeating units in the copolymer. Of course, the polymer may also be a homopolymer to the extent that it contains 100 mol. % of the repeating units of formula (II). Specific examples of such homopolymers include poly(4-(2,3-dihydrothieno-[3,4-b][1,4]dioxin-2-ylmethoxy)-1-butane-sulphonic acid, salt) and poly(4-(2,3-dihydrothieno-[3,4-b][1,4]dioxin-2-ylmethoxy)-1-propanesulphonic acid, salt).

Regardless of the particular nature of the polymer, the resulting conductive polymer particles typically have an average size (e.g., diameter) of from about 1 to about 80 nanometers, in some embodiments from about 2 to about 70 nanometers, and in some embodiments, from about 3 to about 60 nanometers. The diameter of the particles may be determined using known techniques, such as by ultracentrifuge, laser diffraction, etc. The shape of the particles may likewise vary. In one particular embodiment, for instance, the particles are spherical in shape. However, it should be understood that other shapes are also contemplated by the present invention, such as plates, rods, discs, bars, tubes, irregular shapes, etc.

Although not necessarily required, the conductive polymer particles may be applied in the form of a dispersion. The concentration of the conductive polymer in the dispersion may vary depending on the desired viscosity of the dispersion and the particular manner in which the dispersion is to be applied to the capacitor element. Typically, however, the polymer constitutes from about 0.1 to about 10 wt. %, in some embodiments from about 0.4 to about 5 wt. %, and in some embodiments, from about 0.5 to about 4 wt. % of the dispersion. The dispersion may also contain one or more components to enhance the overall properties of the resulting solid electrolyte. For example, the dispersion may contain a binder to further enhance the adhesive nature of the polymeric layer and also increase the stability of the particles within the dispersion. The binder may be organic in nature, such as polyvinyl alcohols, polyvinyl pyrrolidones, polyvinyl chlorides, polyvinyl acetates, polyvinyl butyrates, polyacrylic acid esters, polyacrylic acid amides, polymethacrylic acid esters, polymethacrylic acid amides, polyacrylonitriles, styrene/acrylic acid ester, vinyl acetate/acrylic acid ester and ethylene/vinyl acetate copolymers, polybutadienes, polyisoprenes, polystyrenes, polyethers, polyesters, polycarbonates, polyurethanes, polyamides, polyimides, polysulfones, melamine formaldehyde resins, epoxide resins, silicone resins or celluloses. Crosslinking agents may also be employed to enhance the adhesion capacity of the binders. Such crosslinking agents may include, for instance, melamine compounds, masked isocyanates or crosslinkable polymers, such as polyurethanes, polyacrylates or polyolefins, and subsequent crosslinking. Dispersion agents may also be employed to facilitate the ability to apply the layer to the anode. Suitable dispersion agents include solvents, such as aliphatic alcohols (e.g., methanol, ethanol, i-propanol and butanol), aliphatic ketones (e.g., acetone and methyl ethyl ketones), aliphatic carboxylic acid esters (e.g., ethyl acetate and butyl acetate), aromatic hydrocarbons (e.g., toluene and xylene), aliphatic hydrocarbons (e.g., hexane, heptane and cyclohexane), chlorinated hydrocarbons (e.g., dichloromethane and dichloroethane), aliphatic nitriles (e.g., acetonitrile), aliphatic sulfoxides and sulfones (e.g., dimethyl sulfoxide and sulfolane), aliphatic carboxylic acid amides (e.g., methylacetamide, dimethylacetamide and dimethylformamide), aliphatic and araliphatic ethers (e.g., diethylether and anisole), water, and mixtures of any of the foregoing solvents. A particularly suitable dispersion agent is water.

In addition to those mentioned above, still other ingredients may also be used in the dispersion. For example, conventional fillers may be used that have a size of from about 10 nanometers to about 100 micrometers, in some embodiments from about 50 nanometers to about 50 micrometers, and in some embodiments, from about 100 nanometers to about 30 micrometers. Examples of such fillers include calcium carbonate, silicates, silica, calcium or barium sulfate, aluminum hydroxide, glass fibers or bulbs, wood flour, cellulose powder carbon black, electrically conductive polymers, etc. The fillers may be introduced into the dispersion in powder form, but may also be present in another form, such as fibers.

Surface-active substances may also be employed in the dispersion, such as ionic or non-ionic surfactants. Furthermore, adhesives may be employed, such as organofunctional silanes or their hydrolysates, for example 3-glycidoxypropyltrialkoxysilane, 3-aminopropyl-triethoxysilane, 3-mercaptopropyl-trimethoxysilane, 3-metacryloxypropylt-rimethoxysilane, vinyltrimethoxysilane or octyltriethoxysilane. The dispersion may also contain additives that increase conductivity, such as ether group-containing compounds (e.g., tetrahydrofuran), lactone group-containing compounds (e.g., γ-butyrolactone or γ-valerolactone), amide or lactam group-containing compounds (e.g., caprolactam, N-methylcaprolactam, N,N-dimethylacetamide, N-methylacetamide, N,N-dimethylformamide (DMF), N-methylformamide, N-methylformanilide, N-methylpyrrolidone (NMP), N-octylpyrrolidone, or pyrrolidone), sulfones and sulfoxides (e.g., sulfolane (tetramethylenesulfone) or dimethylsulfoxide (DMSO)), sugar or sugar derivatives (e.g., saccharose, glucose, fructose, or lactose), sugar alcohols (e.g., sorbitol or mannitol), furan derivatives (e.g., 2-furancarboxylic acid or 3-furancarboxylic acid), an alcohols (e.g., ethylene glycol, glycerol, di- or triethylene glycol).

The dispersion may be applied using a variety of known techniques, such as by spin coating, impregnation, pouring, dropwise application, injection, spraying, doctor blading, brushing, printing (e.g., ink-jet, screen, or pad printing), or dipping. The viscosity of the dispersion is typically from about 0.1 to about 100,000 mPas (measured at a shear rate of 100 $s^{-1}$), in some embodiments from about 1 to about 10,000 mPas, in some embodiments from about 10 to about 1,500 mPas, and in some embodiments, from about 100 to about 1000 mPas.

i. Inner Layers

The solid electrolyte is generally formed from one or more "inner" conductive polymer layers. The term "inner" in this context refers to one or more layers that overly the dielectric, whether directly or via another layer (e.g., pre-coat layer). One or multiple inner layers may be employed. For example, the solid electrolyte typically contains from 2 to 30, in some embodiments from 4 to 20, and in some embodiments, from about 5 to 15 inner layers (e.g., 10 layers). The inner layer(s) may, for example, contain intrinsically and/or extrinsically conductive polymer particles such as described above. For instance, such particles may constitute about 50 wt. % or more, in some embodiments about 70 wt. % or more, and in some embodiments, about 90 wt. % or more (e.g., 100 wt. %) of the inner layer(s). In alternative embodiments, the inner layer(s) may contain an in-situ polymerized conductive polymer. In such embodiments, the in-situ polymerized polymers may constitute about 50 wt. % or more, in some embodiments about 70 wt. % or more, and in some embodiments, about 90 wt. % or more (e.g., 100 wt. %) of the inner layer(s).

ii. Outer Layers

The solid electrolyte may also contain one or more optional "outer" conductive polymer layers that overly the inner layer(s) and are formed from a different material. For example, the outer layer(s) may contain extrinsically conductive polymer particles. In one particular embodiment, the outer layer(s) are formed primarily from such extrinsically conductive polymer particles in that they constitute about 50 wt. % or more, in some embodiments about 70 wt. % or more, and in some embodiments, about 90 wt. % or more (e.g., 100 wt. %) of a respective outer layer. One or multiple outer layers may be employed. For example, the solid electrolyte may contain from 2 to 30, in some embodiments from 4 to 20, and in some embodiments, from about 5 to 15 outer layers, each of which may optionally be formed from a dispersion of the extrinsically conductive polymer particles.

D. External Polymer Coating

An external polymer coating may also overly the solid electrolyte. The external polymer coating may contain one or more layers formed from pre-polymerized conductive polymer particles such as described above (e.g., dispersion of extrinsically conductive polymer particles). The external coating may be able to further penetrate into the edge region of the capacitor body to increase the adhesion to the dielectric and result in a more mechanically robust part, which may reduce equivalent series resistance and leakage current. Because it is generally intended to improve the degree of edge coverage rather to impregnate the interior of the anode body, the particles used in the external coating typically have a larger size than those employed in the solid electrolyte. For example, the ratio of the average size of the particles employed in the external polymer coating to the average size of the particles employed in any dispersion of the solid electrolyte is typically from about 1.5 to about 30, in some embodiments from about 2 to about 20, and in some embodiments, from about 5 to about 15. For example, the particles employed in the dispersion of the external coating may have an average size of from about 80 to about 500 nanometers, in some embodiments from about 90 to about 250 nanometers, and in some embodiments, from about 100 to about 200 nanometers.

If desired, a crosslinking agent may also be employed in the external polymer coating to enhance the degree of adhesion to the solid electrolyte. Typically, the crosslinking agent is applied prior to application of the dispersion used in the external coating. Suitable crosslinking agents are described, for instance, in U.S. Patent Publication No. 2007/0064376 to Merker, et al. and include, for instance, amines (e.g., diamines, triamines, oligomer amines, polyamines, etc.); polyvalent metal cations, such as salts or compounds of Mg, Al, Ca, Fe, Cr, Mn, Ba, Ti, Co, Ni, Cu, Ru, Ce or Zn, phosphonium compounds, sulfonium compounds, etc. Particularly suitable examples include, for instance, 1,4-diaminocyclohexane, 1,4-bis(amino-methyl)cyclohexane, ethylenediamine, 1,6-hexanediamine, 1,7-heptanediamine, 1,8-octanediamine, 1,9-nonanediamine, 1,10-decanediamine, 1,12-dodecanediamine, N,N-dimethylethylenediamine, N,N,N',N'-tetramethylethylenediamine, N,N,N',N'-tetramethyl-1,4-butanediamine, etc., as well as mixtures thereof.

The crosslinking agent is typically applied from a solution or dispersion whose pH is from 1 to 10, in some embodiments from 2 to 7, in some embodiments, from 3 to 6, as determined at 25° C. Acidic compounds may be employed to help achieve the desired pH level. Examples of solvents or dispersants for the crosslinking agent include water or organic solvents, such as alcohols, ketones, carboxylic esters, etc. The crosslinking agent may be applied to the capacitor body by any known process, such as spin-coating, impregnation, casting, dropwise application, spray application, vapor deposition, sputtering, sublimation, knife-coating, painting or printing, for example inkjet, screen or pad printing. Once applied, the crosslinking agent may be dried prior to application of the polymer dispersion. This process may then be repeated until the desired thickness is achieved. For example, the total thickness of the entire external polymer coating, including the crosslinking agent and dispersion layers, may range from about 1 to about 50 μm, in some embodiments from about 2 to about 40 μm, and in some embodiments from about 5 to about 20 μm.

E. Cathode Coating

If desired, the capacitor element may also employ a cathode coating that overlies the solid electrolyte and other optional layers (e.g., external polymer coating). The cathode coating may contain a metal particle layer includes a plurality of conductive metal particles dispersed within a polymer matrix. The particles typically constitute from about 50 wt. % to about 99 wt. %, in some embodiments from about 60 wt. % to about 98 wt. %, and in some embodiments, from about 70 wt. % to about 95 wt. % of the layer, while the polymer matrix typically constitutes from about 1 wt. % to about 50 wt. %, in some embodiments from about 2 wt. % to about 40 wt. %, and in some embodiments, from about 5 wt. % to about 30 wt. % of the layer.

The conductive metal particles may be formed from a variety of different metals, such as copper, nickel, silver, nickel, zinc, tin, lead, copper, aluminum, molybdenum, titanium, iron, zirconium, magnesium, etc., as well as alloys thereof. Silver is a particularly suitable conductive metal for use in the layer. The metal particles often have a relatively small size, such as an average size of from about 0.01 to about 50 micrometers, in some embodiments from about 0.1 to about 40 micrometers, and in some embodiments, from about 1 to about 30 micrometers. Typically, only one metal particle layer is employed, although it should be understood that multiple layers may be employed if so desired. The total thickness of such layer(s) is typically within the range of from about 1 μm to about 500 μm, in some embodiments from about 5 μm to about 200 μm, and in some embodiments, from about 10 μm to about 100 μm.

The polymer matrix typically includes a polymer, which may be thermoplastic or thermosetting in nature. Typically, however, the polymer is selected so that it can act as a barrier to electromigration of silver ions, and also so that it contains a relatively small amount of polar groups to minimize the degree of water adsorption in the cathode coating. In this regard, the present inventors have found that vinyl acetal polymers are particularly suitable for this purpose, such as polyvinyl butyral, polyvinyl formal, etc. Polyvinyl butyral, for instance, may be formed by reacting polyvinyl alcohol with an aldehyde (e.g., butyraldehyde). Because this reaction is not typically complete, polyvinyl butyral will generally have a residual hydroxyl content. By minimizing this content, however, the polymer can possess a lesser degree of strong polar groups, which would otherwise result in a high degree of moisture adsorption and result in silver ion migration. For instance, the residual hydroxyl content in polyvinyl acetal may be about 35 mol. % or less, in some embodiments about 30 mol. % or less, and in some embodiments, from about 10 mol. % to about 25 mol. %. One commercially available example of such a polymer is available from Sekisui Chemical Co., Ltd. under the designation "BH-S" (polyvinyl butyral).

To form the cathode coating, a conductive paste is typically applied to the capacitor that overlies the solid electrolyte. One or more organic solvents are generally employed in the paste. A variety of different organic solvents may generally be employed, such as glycols (e.g., propylene glycol, butylene glycol, triethylene glycol, hexylene glycol, polyethylene glycols, ethoxydiglycol, and dipropyleneglycol); glycol ethers (e.g., methyl glycol ether, ethyl glycol ether, and isopropyl glycol ether); ethers (e.g., diethyl ether and tetrahydrofuran); alcohols (e.g., benzyl alcohol, methanol, ethanol, n-propanol, iso-propanol, and butanol); triglycerides; ketones (e.g., acetone, methyl ethyl ketone, and methyl isobutyl ketone); esters (e.g., ethyl acetate, butyl acetate, diethylene glycol ether acetate, and methoxypropyl acetate); amides (e.g., dimethylformamide, dimethylacetamide, dimethylcaprylic/capric fatty acid amide and N-alkylpyrrolidones); nitriles (e.g., acetonitrile, propionitrile, butyronitrile and benzonitrile); sulfoxides or sulfones (e.g., dimethyl sulfoxide (DMSO) and sulfolane); etc., as well as mixtures thereof. The organic solvent(s) typically constitute from about 10 wt. % to about 70 wt. %, in some embodiments from about 20 wt. % to about 65 wt. %, and in some embodiments, from about 30 wt. % to about 60 wt. %. of the paste. Typically, the metal particles constitute from about 10 wt. % to about 60 wt. %, in some embodiments from about 20 wt. % to about 45 wt. %, and in some embodiments, from about 25 wt. % to about 40 wt. % of the paste, and the resinous matrix constitutes from about 0.1 wt. % to about 20 wt. %, in some embodiments from about 0.2 wt. % to about 10 wt. %, and in some embodiments, from about 0.5 wt. % to about 8 wt. % of the paste.

The paste may have a relatively low viscosity, allowing it to be readily handled and applied to a capacitor element. The viscosity may, for instance, range from about 50 to about 3,000 centipoise, in some embodiments from about 100 to about 2,000 centipoise, and in some embodiments, from about 200 to about 1,000 centipoise, such as measured with a Brookfield DV-1 viscometer (cone and plate) operating at a speed of 10 rpm and a temperature of 25° C. If desired, thickeners or other viscosity modifiers may be employed in the paste to increase or decrease viscosity. Further, the thickness of the applied paste may also be relatively thin and still achieve the desired properties. For example, the thickness of the paste may be from about 0.01 to about 50 micrometers, in some embodiments from about 0.5 to about 30 micrometers, and in some embodiments, from about 1 to about 25 micrometers. Once applied, the metal paste may be optionally dried to remove certain components, such as the organic solvents. For instance, drying may occur at a temperature of from about 20° C. to about 150° C., in some embodiments from about 50° C. to about 140° C., and in some embodiments, from about 80° C. to about 130° C.

F. Other Components

If desired, the capacitor may also contain other layers as is known in the art. In certain embodiments, for instance, a carbon layer (e.g., graphite) may be positioned between the solid electrolyte and the silver layer that can help further limit contact of the silver layer with the solid electrolyte. In addition, a pre-coat layer may also be employed that overlies the dielectric and includes an organometallic compound, such as described in more detail below.

II. Terminations

Once the desired layers are formed, the capacitor may be provided with terminations as indicated above. More particularly, the capacitor contains an anode termination to which an anode lead of the capacitor element is electrically connected and a cathode termination to which the solid electrolyte of the capacitor element is electrically connected. Any conductive material may be employed to form the terminations, such as a conductive metal (e.g., copper, nickel, silver, nickel, zinc, tin, palladium, lead, copper, aluminum, molybdenum, titanium, iron, zirconium, magnesium, and alloys thereof). Particularly suitable conductive metals include, for instance, copper, copper alloys (e.g., copper-zirconium, copper-magnesium, copper-zinc, or copper-iron), nickel, and nickel alloys (e.g., nickel-iron). The thickness of the terminations is generally selected to minimize the thickness of the capacitor. For instance, the thickness of the terminations may range from about 0.05 to about 1 millimeter, in some embodiments from about 0.05 to about 0.5 millimeters, and from about 0.07 to about 0.2 millimeters. One exemplary conductive material is a copper-iron alloy metal plate available from Wieland (Germany). If desired, the surface of the terminations may be electroplated with nickel, silver, gold, tin, etc. as is known in the art to ensure that the final part is mountable to the circuit board. In one particular embodiment, both surfaces of the terminations are plated with nickel and silver flashes, respectively, while the mounting surface is also plated with a tin solder layer.

The terminations may be connected to the capacitor element using any technique known in the art. In one embodiment, for example, a lead frame may be provided that defines the cathode termination and anode termination. To attach the capacitor element to the lead frame, a conductive adhesive may initially be applied to a surface of the cathode termination. The conductive adhesive may include, for instance, conductive metal particles contained with a resin composition. The metal particles may be silver, copper, gold, platinum, nickel, zinc, bismuth, etc. The resin composition may include a thermoset resin (e.g., epoxy resin), curing agent (e.g., acid anhydride), and coupling agent (e.g., silane coupling agents). Suitable conductive adhesives may be described in U.S. Patent Application Publication No. 2006/0038304 to Osako, et al. Any of a variety of techniques may be used to apply the conductive adhesive to the cathode termination. Printing techniques, for instance, may be employed due to their practical and cost-saving benefits. The anode lead may also be electrically connected to the anode termination using any technique known in the art, such as mechanical welding, laser welding, conductive adhesives, etc. Upon electrically connecting the anode lead to the anode termination, the conductive adhesive may then be cured to ensure that the electrolytic capacitor is adequately adhered to the cathode termination.

Referring to FIG. 1, for example, a capacitor 30 is shown as including an anode termination 62 and a cathode termination 72 in electrical connection with a capacitor element 33 having an upper surface 37, lower surface 39, front surface 36, rear surface 38, first side surface 35, and opposing side surface (not shown). The cathode termination 72 may be provided in electrical contact with any surface of the capacitor element, such as via a conductive adhesive. In the illustrated embodiment, for example, the cathode termination 72 contains a first component 73 that is generally parallel and adjacent to the upper surface 37 and a second component 75 that is generally parallel and adjacent to the lower surface 39. The first component 73 is also in electrical contact with the upper surface 37. The cathode termination 72 may also contain a third component 77 generally extends in a direction perpendicular to the first component 73 and second component 75. If desired, the third component 77 may also be provided in electrical contact with the rear surface 38 of the capacitor element 33. The anode termination 62 likewise contains a first component 63 that is generally parallel to the lower surface 39 of the capacitor element 33 and a second component 67 that is generally parallel to the anode lead 16. Further, the anode termination 62 may include a third component 64 that is generally perpendicular to the first component 63 and a fourth component 69 that is generally perpendicular to the second component 67 and located adjacent to the anode lead 16. In the illustrated embodiment, the second component 67 and fourth component 69 define a region 51 for connection to the anode lead 16. Although not depicted in FIG. 1, the region 51 may possess a "U-shape" to further enhance surface contact and mechanical stability of the lead 16.

The terminations may be connected to the capacitor element using any technique known in the art. In one embodiment, for example, a lead frame may be provided that defines the cathode termination 72 and anode termination 62. To attach the capacitor element 33 to the lead frame, a conductive adhesive 49 may initially be applied to a surface of the cathode termination 72. In one embodiment, the anode termination 62 and cathode termination 72 are folded into the position shown in FIG. 1. Thereafter, the capacitor element 33 is positioned on the cathode termination 72 so that its lower surface 39 contacts the adhesive 49 and the anode lead 16 contacts the region 51. The anode lead 16 is then electrically connected to the region 51 using any technique known in the art, such as mechanical welding, laser welding, conductive adhesives, etc. For example, the anode lead 16 may be welded to the anode termination 62 using a laser. Lasers generally contain resonators that include a laser medium capable of releasing photons by stimulated emission and an energy source that excites the elements of the laser medium. One type of suitable laser is one in which the laser medium consist of an aluminum and yttrium garnet (YAG), doped with neodymium (Nd). The excited particles are neodymium ions $Nd^{3+}$. The energy source may provide continuous energy to the laser medium to emit a continuous laser beam or energy discharges to emit a pulsed laser beam. Upon electrically connecting the anode lead 16 to the anode termination 62, the conductive adhesive may then be cured. For example, a heat press may be used to apply heat and pressure to ensure that the electrolytic capacitor element 33 is adequately adhered to the cathode termination 72 by the adhesive 49.

III. Barrier Coating

As indicated above, a barrier coating is disposed adjacent to the anode termination and/or cathode termination so that it is in contact with the casing material. One or multiple coatings may be employed. In one embodiment, for instance, a barrier coating may be employed that covers at least a portion of the anode termination. In such embodiments, the coating may also contact at least a portion of a surface of the capacitor element, such as a front surface, bottom surface, and/or top surface of the capacitor element. Likewise, the coating may also contact at least a portion of the anode lead. In another embodiment, a barrier coating may be employed that covers at least a portion of the cathode termination. In such embodiments, the coating may also contact at least a portion of a surface of the capacitor element, such as a rear surface, top surface, and/or bottom surface. Referring again to FIG. 1, for example, the capacitor 30 is shown with a barrier coating 90 that is on the anode termination 62. More particularly, in the illustrated embodiment, the coating 90 is in contact with the second component 67 and the fourth component 69 of the anode termination 62 so that the region 51 is generally covered. The coating 90 is also in contact with at least a portion of the anode lead 16, particularly at those locations surrounding the region 51 at which the lead 16 is connected to the anode termination 62. Of course, it should be understood that the coating may also be provided in other configurations and disposed on any surface desired. In one embodiment, for example, the coating may contact only the second component 67 of the anode termination 62.

IV. Casing Material

As indicated, the capacitor element and anode lead are generally encapsulated with a casing material so that at least a portion of the anode and cathode terminations are exposed for mounting onto a circuit board. Referring again to FIG. 1, for instance, the capacitor element 33 and anode lead 16 may be encapsulated within a casing material 28 so that a portion of the anode termination 62 and a portion of the cathode termination 72 remain exposed. Further, as noted above, at least a portion of the casing material 28 is also in contact with the barrier coating 90.

The casing material may be formed from a wide variety of materials. In one embodiment, for instance, the casing material may be formed from a curable resinous matrix, which may be hydrophobic. In certain embodiments, for example, the resinous matrix may contain a polycyanate containing at least two cyanate ester groups. When cured, for example, the polycyanate may form a polycyanurate having a triazine ring. Due to the high degree of symmetry in the triazine ring, where dipoles associated with the carbon-nitrogen and carbon-oxygen bonds are counterbalanced, the resulting polycyanurate can have a relatively high degree of moisture resistance. Suitable polycyanates may include, for instance, bisphenol A dicyanate; the dicyanates of 4,4'-dihydroxydiphenyl, 4,4'-dihydroxydiphenyl oxide, resorcinyl, hydroquinone, 4,4'-thiodiphenol, 4,4'-sulfonyldiphenyl, 3,3',5,5'-tetrabromobisphenol A, 2,2',6,6'-tetrabromobisphenol A, 2,2'-dihydroxydiphenyl, 3,3'-dimethoxybisphenol A, 4,4'-dihydroxydiphenylcarbonate, dicyclopentadiene diphenol, 4,4'-dihydroxybenzophenone, 4,4'-dihydroxydiphenylmethane, tricyclopentadiene diphenol, etc.; the tricyanate of tris(hydroxyphenyl)methane, the tetracyanate of 2,2',4,4'-tetrahydroxydiphenyl methane, the polycyanate of a phenol-formaldehyde condensation product (novolac); the polycyanate of a dicyclopentadiene and phenol condensation product; and so forth. If desired, the polycyanate may also contain one or more polycyclic aliphatic radicals containing two or more cyclic rings, such as a $C_7$-$C_{20}$ polycyclic aliphatic radical, including cyclopentadiene, norbornane, bornane, norbornadiene, trahydroindene, methyltetrahydroindene, dicyclopentadiene, bicyclo-(2,2, I)-hepta-2,5-diene, 5-methylene-2-norbornene, 5-ethylidene-2-norbornene, 5-propenyl-2-norbornene, 5-(4-cyclopentenyl)-2-norbornene, 5-cyclohexylidene-2-norbornene, 5-vinyl-2-norbornene, etc. In one particular embodiment, for instance, the polycyanate may be a dicyclopentadiene bisphenol cyanate ester. Without intending to be limited by theory, it is believed such polycyclic radicals can act as a nonpolar bridging group for the polycyanate, which helps improve moisture resistance.

The resinous matrix may also contain an epoxy resin, either alone or in combination with a polycyanate. When used in combination, the epoxy resin can react with the polycyanate to form a copolymer and/or crosslink with the polycyanate resin when cured. Examples of suitable epoxy resins include, for instance, bisphenol A type epoxy resins, bisphenol F type epoxy resins, phenol novolac type epoxy resins, orthocresol novolac type epoxy resins, brominated epoxy resins and biphenyl type epoxy resins, cyclic aliphatic epoxy resins, glycidyl ester type epoxy resins, glycidylamine type epoxy resins, cresol novolac type epoxy resins, naphthalene type epoxy resins, phenol aralkyl type epoxy resins, cyclopentadiene type epoxy resins, heterocyclic epoxy resins, etc. To help provide the desired degree of moisture resistance, however, it is particularly desirable to employ epoxy phenol novolac ("EPN") resins, which are glycidyl ethers of phenolic novolac resins. These resins can be prepared, for example, by reaction of phenols with an excess of formaldehyde in the presence of an acidic catalyst to produce the phenolic novolac resin. Novolac epoxy resins are then prepared by reacting the phenolic novolac resin with epichlorihydrin in the presence of sodium hydroxide. Specific examples of the novolac-type epoxy resins include a phenol-novolac epoxy resin, cresol-novolac epoxy resin, naphthol-novolac epoxy resin, naphthol-phenol co-condensation novolac epoxy resin, naphthol-cresol co-condensation novolac epoxy resin, brominated phenol-novolac epoxy resin, etc. Regardless of the type of resin selected, the resulting phenolic novolac epoxy resins typically have more than two oxirane groups and can be used to produce cured coating compositions with a high crosslinking density, which can be particularly suitable for enhancing moisture resistance. One such phenolic novolac epoxy resin is poly[(phenyl glycidyl ether)-co-formaldehyde]. Other suitable resins are commercially available under the trade designation ARALDITE (e.g., GY289, EPN 1183, EP 1179, EPN 1139, and EPN 1138) from Huntsman.

The polycyanate and/or epoxy resin may be crosslinked with a co-reactant (hardener) to further improve the mechanical properties of the composition and also enhance its overall moisture resistance as noted above. Examples of such co-reactants may include, for instance, polyamides, amidoamines (e.g., aromatic amidoamines such as aminobenzamides, aminobenzanilides, and aminobenzenesulfonamides), aromatic diamines (e.g., diaminodiphenylmethane, diaminodiphenylsulfone, etc.), aminobenzoates (e.g., trimethylene glycol di-p-aminobenzoate and neopentyl glycol di-p-amino-benzoate), aliphatic amines (e.g., triethylenetetramine, isophoronediamine), cycloaliphatic amines (e.g., isophorone diamine), imidazole derivatives, guanidines (e.g., tetramethylguanidine), carboxylic acid anhydrides (e.g., methylhexahydrophthalic anhydride), carboxylic acid hydrazides (e.g., adipic acid hydrazide), phenolic-novolac resins (e.g., phenol novolac, cresol novolac, etc.), carboxylic acid amides, etc., as well as combinations thereof. Phenolic-novolac resins may be particularly suitable for use in the present invention.

The casing material may also contain an inorganic oxide filler. Such fillers are typically maintained at a high level of the casing material, such as from about 75 wt. % to about 99.5 wt. %, in some embodiments from about 76 wt. % to about 99 wt. %, and in some embodiments, from about 77 wt. % to about 90 wt. % of the casing material, while the resinous matrix typically constitutes from about 0.5 wt. % to about 25 wt. %, in some embodiments from about 1 wt. % to about 24 wt. %, and in some embodiments, from about 10 wt. % to about 23 wt. % of the casing material. The nature of the inorganic oxide fillers may vary, such as silica, alumina, zirconia, magnesium oxides, iron oxides (e.g., iron hydroxide oxide yellow), titanium oxides (e.g., titanium dioxide), zinc oxides (e.g., boron zinc hydroxide oxide), copper oxides, zeolites, silicates, clays (e.g., smectite clay), etc., as well as composites (e.g., alumina-coated silica particles) and mixtures thereof. Regardless of the particular fillers employed, however, a substantial portion, if not all, of the inorganic oxide fillers is typically in the form of vitreous silica, which is believed to further improve the resistance of the casing material to thermal expansion due to its high purity and relatively simple chemical form. Vitreous silica may, for instance, constitute about 30 wt. % or more, in some embodiments from about 35 wt. % to about 90 wt. %, and in some embodiments, from about 40 wt. % to about 80 wt. % of the total weight of fillers employed in the composition, as well as from about 20 wt. % to about 70 wt. %, in some embodiments from about 25 wt. % to about 65 wt. %, and in some embodiments from about 30 wt. % to about 60 wt. % of the entire composition. Of course, other forms of silica may also be employed in combination with the vitreous silica, such as quartz, fumed silica, cristabolite, etc.

Apart from the components noted above, it should be understood that still other additives may also be employed in the casing material, such as photoinitiators, viscosity modifiers, suspension aiding agents, pigments, stress reducing agents, coupling agents (e.g., silane coupling agents), stabilizers, etc. When employed, such additives typically constitute from about 0.1 to about 20 wt. % of the total composition.

The particular manner in which the casing material is applied to the capacitor element may vary as desired. In one particular embodiment, the capacitor element is placed in a mold and the casing material is applied to the capacitor element so that it occupies the spaces defined by the mold and leaves exposed at least a portion of the anode and cathode terminations. The casing material may be initially provided in the form of a single or multiple compositions. For instance, a first composition may contain the resinous matrix and filler and the second composition may contain a co-reactant. Regardless, once it is applied, the casing material may be heated or allowed to stand at ambient temperatures so that the resinous matrix is allowed to crosslink with the co-reactant, which thereby causes the casing material to cure and harden into the desired shape of the case. For instance, the casing material may be heated to a temperature of from about 15° C. to about 150° C., in some embodiments from about 20° C. to about 120° C., and in some embodiments, from about 25° C. to about 100° C.

The present invention may be better understood by reference to the following examples.

Test Procedures

Capacitance

The capacitance may be measured using a Keithley 3330 Precision LCZ meter with Kelvin Leads with 2.2 volt DC bias and a 0.5 volt peak to peak sinusoidal signal. The operating frequency may be 120 Hz and the temperature may be 23° C.±2° C. In some cases, the "wet-to-dry" capacitance can be determined. The "dry capacitance" refers to the capacitance of the part before application of the solid electrolyte, graphite, and silver layers, while the "wet capacitance" refers to the capacitance of the part after formation of the dielectric, measured in 14% nitric acid in reference to 1 mF tantalum cathode with 10 volt DC bias and a 0.5 volt peak to peak sinusoidal signal after 30 seconds of electrolyte soaking.

Equivalent Series Resistance (ESR)

Equivalence series resistance may be measured using a Keithley 3330 Precision LCZ meter with Kelvin Leads 2.2 volt DC bias and a 0.5 volt peak to peak sinusoidal signal. The operating frequency may 100 kHz and the temperature may be 23° C.±2° C.

Dissipation Factor

The dissipation factor may be measured using a Keithley 3330 Precision LCZ meter with Kelvin Leads with 2.2 volt DC bias and a 0.5 volt peak to peak sinusoidal signal. The operating frequency may be 120 Hz and the temperature may be 23° C.±2° C.

Leakage Current

Leakage current may be measured using a leakage test meter at a temperature of 23° C.±2° C. and at the rated voltage after a minimum of 60 seconds.

Load Humidity Testing

Humidity testing may be based on standard IEC 68-2-67: 1995 (85° C./85% relative humidity). 25 test parts (mounted on a printed circuit board substrate) may be loaded with rated voltage at the aforementioned humidity test conditions. Capacitance and ESR may be measured at 0, 120, 250, 500, 1000 and 1500 hours at a temperature of 23° C.±2° C. after 2 to 24 hours from recovery of the humidity test conditions.

High Temperature Storage Testing

High temperature storage testing may be based on IEC 60068-2-2:2007 (condition Bb, temperature 150° C.). 25 test parts (not mounted on a printed circuit board substrate) may be tested at the aforementioned temperature conditions. All measurements of capacitance and ESR may be conducted at a temperature of 23° C.±2° C. after 1 to 2 hours from recovery of the temperature test conditions.

Example 1

50,000 μFV/g tantalum powder was used to form anode samples. Each anode sample was embedded with a tantalum wire, sintered at 1380° C., and pressed to a density of 5.8 g/cm$^3$. The resulting pellets had a size of 1.7×2.4×1.0 mm. The pellets were anodized to 24.5 volts in water/phosphoric acid electrolyte with a conductivity of 8.6 mS/cm at a temperature of 85° C. to form the dielectric layer. The pellets were anodized again to 80 volts in a water/boric acid/disodium tetraborate with a conductivity of 2.0 mS/cm at a temperature of 30° C. for 25 seconds to form a thicker oxide layer built up on the outside. A conductive polymer coating was then formed by dipping the anode into a butanol solution of iron (III) toluenesulfonate (Clevios™ C, Heraeus) and consequently into 3,4-ethylenedioxythiophene (Clevios™ M, Heraeus) and polymerized. After 45 minutes of polymerization, a thin layer of poly(3,4-ethylenedioxythiophene) was formed on the surface of the dielectric. The anode was washed in methanol to remove reaction by-products, anodized in a liquid electrolyte, and washed again in methanol. This process was repeated 6 times. Thereafter, the parts were dipped into a dispersed poly(3,4-ethylenedioxythiophene) having a solids content of 2.0% and viscosity 20 mPa·s (Clevios™ K, Heraeus). Upon coating, the parts were dried at 125° C. for 20 minutes. This process was repeated 3 times. Thereafter, the parts were dipped into a dispersed poly(3,4-ethylenedioxythiophene) having a solids content of 2.0% and viscosity 160 mPa·s (Clevios™ K, Heraeus). Upon coating, the parts were dried at 125° C. for 20 minutes. This process was repeated 12 times. The parts were then dipped into a graphite dispersion and dried. The parts were dipped into a silver dispersion and dried. Finally, the parts were mounted with metal terminations formed from a copper base material. Multiple parts (500) of 47 µF/10V capacitors were made in this manner and encapsulated in a standard silica resin.

Example 2

Capacitors were formed in the manner described in Example 1, except that the resulting parts were dip coated by a hydrophobic resinous material as described herein (glass transition temperature of approximately 100° C.) after silver dispersion application and dried. Multiple parts (500) of 47 µF/10V capacitors were made in this manner and encapsulated in a standard silica resin.

Example 3

Capacitors were formed in the manner described in Example 1, except that the hydrophobic resinous material was applied on connection site of the anode lead and the anode termination and dried. Multiple parts (500) of 47 µF/10V capacitors were made in this manner and encapsulated in a standard silica resin.

Samples of the parts of Example 1 and 2 were subjected to high temperature storage testing. The results of ESR and capacitance at high temperature storage testing are set forth below in Tables 1 and 2.

TABLE 1

High Temperature Storage Testing-Capacitance

| Time (hrs) | Example 1 Average Capacitance (µF) | Example 2 Average Capacitance (µF) |
|---|---|---|
| 0 | 42.58 | 43.54 |
| 500 | 42.23 | 43.15 |
| 1000 | 41.55 | 43.09 |
| 1500 | 32.96 | 43.10 |
| 2000 | 29.71 | 43.08 |
| 2500 | 29.37 | 43.03 |
| 3000 | 25.29 | 42.98 |

TABLE 2

High Temperature Storage Testing-ESR

| Time (hrs) | Example 1 Average ESR (Ohm) | Example 2 Average ESR (Ohm) |
|---|---|---|
| 0 | 0.0458 | 0.0455 |
| 500 | 0.1334 | 0.0539 |
| 1000 | 22.0584 | 0.0553 |
| 1500 | 103.0406 | 0.0554 |
| 2000 | 255.8239 | 0.0565 |
| 2500 | 610.7659 | 0.0568 |
| 3000 | 2111.1757 | 0.0578 |

Samples of parts of Examples 1 and 3 were also subjected to load humidity testing. The results of leakage current at load humidity testing are set forth below in Table 3.

TABLE 3

Load Humidity Testing-Leakage Current

| Time (hrs) | Example 1 Average Leakage Current (µA) | Example 3 Average Leakage Current (µA) |
|---|---|---|
| 0 | 3.41 | 3.22 |
| 120 | 0.29 | 0.40 |
| 250 | 0.76 | 0.27 |
| 500 | 0.76 | 0.29 |
| 1000 | 56.54 | 0.36 |
| 1500 | 115.35 | 0.41 |

These and other modifications and variations of the present invention may be practiced by those of ordinary skill in the art, without departing from the spirit and scope of the present invention. In addition, it should be understood that aspects of the various embodiments may be interchanged both in whole or in part. Furthermore, those of ordinary skill in the art will appreciate that the foregoing description is by way of example only, and is not intended to limit the invention so further described in such appended claims.

What is claimed is:

1. A solid electrolytic capacitor comprising:
    a capacitor element that contains a sintered porous anode body, a dielectric that overlies the anode body, and a solid electrolyte that overlies the dielectric;
    an anode lead extending from a surface of the capacitor element;
    an anode termination that is in electrical connection with the anode lead and a cathode termination that is in electrical connection with the solid electrolyte,
    a casing material that encapsulates the capacitor element and anode lead; and
    a barrier coating that is disposed on at least a portion of the anode termination and/or cathode termination and is in contact with the casing material, wherein the coating comprises a hydrophobic resinous material, wherein the resinous material contains an olefin polymer having a glass transition temperature of from about 20° C. to about 160° C.

2. The solid electrolytic capacitor of claim 1, wherein the olefin polymer includes a cycloolefin polymer.

3. The solid electrolytic capacitor of claim 2, wherein the cycloolefin polymer is formed from a cycloolefin monomer.

4. The solid electrolytic capacitor of claim 3, wherein the monomer includes a bicyclic cycloolefin.

5. The solid electrolytic capacitor of claim 3, wherein the bicyclic cycoolefin includes norbornene.

6. The solid electrolytic capacitor of claim 3, wherein the cycoolefin polymer is formed from a tetracyclic cycloolefin.

7. The solid electrolytic capacitor of claim 6, wherein the tetracyclic cycoolefin includes tetracyclododecene.

8. The solid electrolytic capacitor of claim 3, wherein the cycloolefin monomer is copolymerized with an α-olefin monomer.

9. The solid electrolytic capacitor of claim 3, wherein the cycloolefin monomer is substituted with a halogenated hydrocarbon functional group.

10. The solid electrolytic capacitor of claim 1, wherein the barrier coating covers at least a portion of the anode termination.

11. The solid electrolytic capacitor of claim 10, wherein the barrier coating also covers at least a portion of the anode lead.

12. The solid electrolytic capacitor of claim 10, wherein the barrier coating also covers at least a portion of the surface of the capacitor element from which the anode lead extends.

13. The solid electrolytic capacitor of claim 1, wherein the casing material is formed from a resinous matrix.

14. The solid electrolytic capacitor of claim 13, wherein the resinous matrix contains an epoxy resin.

15. The solid electrolytic capacitor of claim 13, wherein the resinous matrix further includes silica in an amount from about 75 wt. % to about 99.5 wt. % of the matrix.

16. The solid electrolytic capacitor of claim 1, wherein the capacitor element further comprises a cathode coating that contains a metal particle layer that overlies the solid electrolyte, wherein the metal particle layer includes a plurality of conductive metal particles.

17. The solid electrolytic capacitor of claim 16, wherein the metal particles include silver.

18. The solid electrolytic capacitor of claim 1, wherein the anode body includes tantalum.

19. The solid electrolytic capacitor of claim 1, wherein the solid electrolyte includes a conductive polymer.

20. The solid electrolytic capacitor of claim 19, wherein the conductive polymer has repeating units of the following formula:

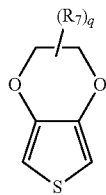

wherein,
$R_7$ is a linear or branched, $C_1$ to $C_{18}$ alkyl radical, $C_5$ to $C_{12}$ cycloalkyl radical, $C_6$ to $C_{14}$ aryl radical, $C_7$ to $C_{18}$ aralkyl radical, or a combination thereof; and
q is an integer from 0 to 8.

21. The solid electrolytic capacitor of claim 20, wherein the conductive polymer is poly(3,4-ethylenedioxythiophene).

22. The solid electrolytic capacitor of claim 20, wherein the solid electrolyte also contains a polymeric counterion.

23. The solid electrolytic capacitor of claim 1, further comprising an external polymer coating that overlies the solid electrolyte and contains pre-polymerized conductive polymer particles and a cross-linking agent.

24. The solid electrolytic capacitor of claim 1, wherein the capacitor exhibits an aged capacitance (determined at about 23° C.) after being exposed to high temperature storage testing at a temperature of 150° C. for 3,000 hours and then being allowed to recover for 1 to 2 hours, and an initial capacitance (determined at about 23° C.) prior to being exposed to the high temperature storage testing, wherein the ratio of the aged capacitance to the initial capacitance is from about 0.6 to 1.

25. The solid electrolytic capacitor of claim 1, wherein the capacitor exhibits an aged ESR (determined at about 23° C.) after being exposed to high temperature storage testing at a temperature of 150° C. for 3,000 hours and then being allowed to recover for 1 to 2 hours, and an initial ESR (determined at about 23° C.) prior to being exposed to the high temperature storage testing, wherein the ratio of the aged ESR to the initial ESR is about 10 or less.

26. The solid electrolytic capacitor of claim 1, wherein the capacitor exhibits an ESR of from about 0.1 to about 60 mohms as determined at a temperature of about 23° C.

27. The solid electrolytic capacitor of claim 1, wherein the capacitor exhibits an aged DCL (determined at about 23° C.) after being exposed to high humidity testing at a relative humidity level of 85% and temperature of 85° C. for 1,500 hours and then being allowed to recover for 1 to 2 hours, and an initial DCL (determined at about 23° C.) prior to being exposed to the high humidity testing, wherein the ratio of the aged DCL to the initial DCL is about 10 or less.

28. A method for forming the solid electrolytic capacitor of claim 1, the method comprising:
disposing a coating formulation on at least a portion of the anode termination, the coating formulation containing a hydrophobic resinous material and a solvent; and
removing the solvent from the coating formulation to form the barrier coating.

29. The method of claim 28, wherein the solvent includes a hydrocarbon solvent.

30. The method of claim 29, wherein the hydrocarbon solvent includes an alicyclic hydrocarbon.

* * * * *